United States Patent [19]

Makino et al.

[11] Patent Number: 4,598,133
[45] Date of Patent: Jul. 1, 1986

[54] ORGANIC GLASS FOR OPTICAL PARTS

[75] Inventors: Kazuo Makino, Gamagori; Akira Matsumoto, Takarazuka; Hideo Kabeya, Gamagori, all of Japan

[73] Assignee: Ito Optical Industrial Co., Ltd., Gamagori, Japan

[21] Appl. No.: 645,363

[22] Filed: Aug. 29, 1984

[30] Foreign Application Priority Data

Mar. 19, 1984 [JP] Japan ................... 59-53253

[51] Int. Cl.$^4$ ............................................. C08F 22/26
[52] U.S. Cl. .................... 526/322; 350/286; 350/409; 526/325; 526/326
[58] Field of Search ........................ 526/322, 325, 326

[56] References Cited

U.S. PATENT DOCUMENTS 4,393,184 7/1983 Tarumi et al. ................... 526/261

Primary Examiner—Theodore E. Pertilla
Attorney, Agent, or Firm—Armstrong, Nikaido, Marmelstein & Kubovcik

[57] ABSTRACT

Organic glass having a high refractive index and excellent other physical properties and being suitable as materials for optical parts such as lenses and prisms. The organic glass comprises a copolymer obtained by adding a polymerization initiator to a mixture of three monomer components of diallyl isophthalate, a benzoate ester with an unsaturated alcohol, and a methacrylate ester and then polymerizing the mixture.

10 Claims, 1 Drawing Figure

ORGANIC GLASS FOR OPTICAL PARTS

BACKGROUND OF THE INVENTION

1. Field of the Invention

The present invention relates to organic glass having a high refractive index and excellent other physical properties and being suitable for materials of optical parts such as lenses and prisms.

2. Description of the Prior Art

In this description, as an example of optical parts, a lens is cited but the optical parts are not limited to it.

Organic glass has been noticed as lens materials for spectacles because of its lightweightness in comparison with inorganic glass, and organic glass comprising the polymer of diethylene glycol bis (allyl carbonate) (abbreviated as "CR-39" hereinafter), methyl methacrylate or the like has been used as the lens material. However, these kinds of organic glass have a refractive index of 1.49-1.50 which is lower than the refractive index of inorganic glass, for example, the one of white crown glass that is 1.523. When such organic glass is used as lens materials for correcting one's eyesight, the glass material becomes thick as compared with an inorganic glass material, so that the material loses its merit of lightweightness and becomes to have a bad appearance. The tendency of the organic glass material becomes stronger with the increasing dioptory of lens. Therefore, the organic glass seemed not always suitable as lense materials, in particular, as high powered lens materials for correcting one's eyesight.

To solve the problems of organic glass, high refractive index-organic glass employing a diallyl phthalate resin has been suggested. However, the organic glass is brittle and its transmissivity has come into questions, so that its performance as lens materials is insufficient.

SUMMARY OF THE INVENTION

The object of the present invention is to provide organic glass for optical parts which has a high refractive index and also excellent physical properties such as excellent transmissivity and toughness (impact resistance) required for lenses.

The above-mentioned object is attained by forming the organic glass for optical parts of the present invention with a copolymer of three monomer components comprising diallyl isophthalate, a benzoate ester with an unsaturated alcohol and a methacrylate ester the polymer of which has a high refractive index.

DESCRIPTION OF THE PREFERRED EMBODIMENT

Figure 1:
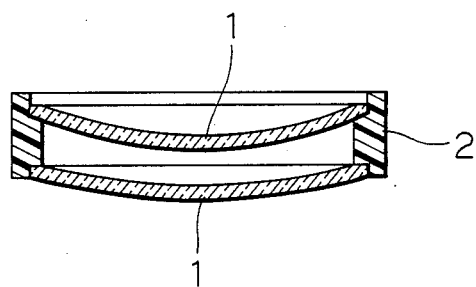
FIG. 1 shows the sectional brawing of a mold used in Examples of the present invention.

Organic glass for optical parts made in accordance with the present invention will be described in detail hereinafter.

The said organic glass for optical parts is obtained by adding a polymerization initiator to a mixture of the following three monomer components (a), (b), and (c) having the following composition and then by copolymerizing the mixture to form the glass.

(a) Diallyl isophthalate—30-85 wt%
(b) Benzoate ester with an unsaturated alcohol—10-65 wt%

Examples: allyl benzoate, vinyl benzoate, and the like.

(c) Methacrylate ester the polymer of which has a refractive index of 1.55 and more—5-35 wt%

Examples: benzyl methacrylate, phenyl methacrylate, and the like.

In the above, when the components (a) is less than 30 wt%, the organic glass is lacking in surface hardness, and when the component (a) exceeds 85 wt%, that is, when the component (b) is less than 10 wt% and the component (c) is less than 5 wt%, an effect of mixing components (b) and (c) does not appear. When the components (c) exceeds 35 wt%, unhomogeneous parts increase and transmissivity lowers or surface hardness becomes little. Preferable amounts for components (c) are 20-35 wt% and 5-20 wt%.

It is assumed that copolymerization of component (b), a benzoate ester with an unsaturated alcohol, having one functional group with component (a), diallyl isophthalate, having two functional groups increases the number of molecules between crosslinks formed by diallyl isophthalate and lowers the crosslinking density of high degree-net work structure formed by diallyl isophthalate and causing the brittleness of the copolymer and, as a result, the component (b) produces a degree of freedom in molecular chains, contributing to improvement in impact resistance of the copolymer. On the other hand, component (c), a methacrylate ester, has not good copolymerizability for diallyl isophthalate. Polymerization of the methacrylate ester results in formation of heterogeneous parts in the copolymer and of local cuts in the net work structure formed by diallyl isophthalate, so that it is assumed that the component (c) contributes to improvement in impact resistance of the copolymer in cooperation with the component (b). This is proved by the result of impact resistance tests (Table 2) to be described later.

Further, a methacrylate ester the polymer of which has a high refractive index is used in order that the refractive index of the resulting copolymer is not lowered.

Examples together with comparative example are cited hereinafter and the present invention will be described in detail.

EXAMPLES 1-8, AND COMPARATIVE EXAMPLES 1-4

A composition comprising a mixture of monomer components (a), (b), and (c) in a composition ratio as shown in Table 1 and 6 PHR of di-isopropyl peroxydicarbonate as a polymerization initiator added and mixed with the mixture was packed into a mold composed of glass molds 1 and 1 and a circular resinous gasket 2, as shown in FIG. 1. The mold was heated from 40° C. to 100° C. in 16 hours and further maintained at 100° C. for 4 hours to complete the polymerization and molding of the above-mentioned composition and thus an organic glass molded article (lens) was obtained. Physical properties of each Example are shown in Table 2 and all of the Examples have a high refractive index, excellent impact resistance and excellent other physical properties such as transmissivity.

Further, in Comparative example 1, CR-39 was polymerized under the same condition as the above polymerization conditions.

EXAMPLE 9

A organo silicic hard coating liquid was applied on a lens obtained in Example 1 by dipping method, and then was heated at 100° C. for 4 hours to cure it. The coating film had a thickness of about 3 microns. The coated lens had adhesion of 100/100, surface hardness of 4H and scratch resistance of A and these characteristics of the coated lens did not change after the lens was dyed with a brown color dye at 90° C. for 30 min. The coated lens was superior to the coated lens made from CR-39 of Comparative example 1 in adhesion to the coating film.

EXAMPLE 10

A lens obtained in Example 1 was sufficiently washed and was vapor deposited in vacuum with $SiO_2$ of thickness of about 5 microns, $Al_2O_3$ of $\lambda/2$ and $SiO_2$ of $\lambda/4$ in proper order. The resulting lens had adhesion of 100/100, surface hardness of 7H and scratch resistance of S. After dipping into hot water at 70° C. for 30 min or placing in a hot air at 100° C. for 30 min, the deposited film on each lens showed no change. The organic glass made in accordance with the present invention had excellent adhesion to an inorganic coating film.

Testing methods for the physical properties are as follows.

(a) Transmissivity—Measured by a visual transmissivity photometer (product of Asahi Bunko Co. Ltd., ASC MODEL 304).

(b) Refractive index and its dispersion—The refractive index and its dispersion of a block having two crossed surfaces polished optically were measured with an Abbe's refractometer (product of Atago Co. Ltd.).

(c) Specific gravity—Calculated from buoyancy measured in pure water at 20° C.

(d) Surface hardness (pencil scrach hardness)—The test was carried out according to JIS K-5400 under a load of 1 kgf, and the hardness was shown by the highest pencil hardness so far as the surface was not damaged.

(e) Scratch resistance—When the surface of lense was rubbed with steel wool of #0000, the grade of damage was indicated as follows.

No damage (S), Scarecely damaged (A), Damaged a little (B), and Severely damaged (c).

(f) Impact resistance—In accordance with the standard of FDA (Food and Drug Administration), 10 specimens were tested for one sample and a steel ball weighing 16.2 g or 25 g was allowed to drop onto each specimen from a height of 127 cm. The ratio of penetrated or broken specimens to 10 specimens was indicated by a fraction.

(g) Adhesion—In accordance with JIS D-0202, 100 checkers were prepared with a knife and a peel test for the checkers was carried out using an adhesive tape made of cellophane. The average number of residual checkers when the test was repeated three times was indicated by a percentage.

(h) Dyability—A lens sample was dipped into a brown color dyeing bath at 90° C. for 30 min, and, after that, its visual transmissivity by the testing method (a) was indicated.

TABLE 1

| | Component (a) Diallyl isophthalate | Component (b) Allyl benzoate | Component (c) Benzyl methacrylate |
|---|---|---|---|
| Example 1 | 60 | 35 | 5 |
| Example 2 | 55 | 35 | 10 |
| Example 3 | 50 | 30 | 20 |
| Example 4 | 50 | 45 | 5 |
| Example 5 | 40 | 55 | 5 |
| Example 6 | 60 | 30 | 10 |
| Example 7 | 60 | 20 | 20 |
| Example 8 | 60 | 10 | 30 |
| comparative example 2 | 20 | 80 | — |
| comparative example 3 | 90 | — | 10 |
| comparative example 4 | 50 | 10 | 40 |

TABLE 2

| | Transmissivity (%) | Refractive index ($N_D$) | Dispersion ($\nu$) | Specific gravity (20° C.) | Surface hardness | Scratch resistance | Impact resistance 16.2 g | Impact resistance 25 g | Dyeability (%) |
|---|---|---|---|---|---|---|---|---|---|
| Example 1 | 92 | 1.566 | 32.8 | 1.236 | 2H | A | 0/10 | 7/10 | 27 |
| Example 2 | 92 | 1.567 | 31.7 | 1.231 | 2H | B | 0/10 | 0/10 | 5 |
| Example 3 | 92 | 1.568 | 31.1 | 1.230 | 2H | B | 0/10 | 0/10 | 5 |
| Example 4 | 92 | 1.569 | 31.5 | 1.234 | 2H | B | 0/10 | 6/10 | 7 |
| Example 5 | 92 | 1.568 | 31.5 | 1.225 | 2H | B | 0/10 | 4/10 | 3 |
| Example 6 | 92 | 1.566 | 32.0 | 1.231 | 2H | B | 0/10 | 0/10 | 22 |
| Example 7 | 92 | 1.566 | 30.6 | 1.233 | 2H | B | 0/10 | 0/10 | 24 |
| Example 8 | 92 | 1.568 | 31.7 | 1.232 | 2H | B | 0/10 | 0/10 | 24 |
| Comparative example 1 | 92 | 1.498 | 53.6 | 1.336 | 2H | A | 0/10 | 0/10 | 25 |
| Comparative example 2 | 92 | — | — | 1.222 | B or less | C | 10/10 | 0/10 | — |
| Comparative example 3 | 90 | 1.566 | 33.8 | 1.252 | 2H | B | 10/10 | 0/10 | 65 |
| Comparative example 4 | 92 | 1.566 | 31.2 | 1.228 | H | C | 0/10 | 0/10 | 23 |

What is claimed is:

1. Organic glass for optical parts which comprises a copolymer obtained by adding a polymerization initiator to a mixture of a monomer composition of (a) 30–85 wt% of diallyl isophthalate, (b) 10–65 wt% of a benzoate ester with an unsaturated alcohol, and (c) 20–35 wt% of a methacrylate ester, a polymer of the methacrylate ester having a refractive index of at least 1.55; and then polymerizing the mixture.

2. The organic glass for optical parts as claimed in claim 1, wherein said benzoate ester with an unsaturated alcohol is allyl benzoate and said methacrylate ester is benzyl methacrylate.

3. The organic glass for optical parts as claimed in claim 2, wherein said polymerization initiator is di-isopropyl peroxydicarbonate.

4. The organic glass for optical parts as claimed in claim 1, wherein said benzoate ester with an unsaturated alcohol is vinyl benzoate and said methacrylate ester is benzyl methacrylate.

5. The organic glass for optical parts as claimed in claim 4, wherein said polymerization initiator is di-isopropyl peroxydicarbonate.

6. Organic glass for optical parts which comprises a copolymer obtained by adding a polymerization initiator to a mixture of a monomer composition of (a) 30–85 wt% of diallyl isophthalate, (b) 10–65 wt% of a benzoate ester with an unsaturated alcohol, and (c) 5–20 wt% of a methacrylate ester, a polymer of the methacrylate ester having a refractive index of at least 1.55; and then polymerizing the mixture.

7. The organic glass for optical parts as claimed in claim 6, wherein said benzoate ester with an unsaturated alcohol is allyl benzoate and said methacrylate ester is benzyl methacrylate.

8. The organic glass for optical parts as claimed in claim 7, wherein said polymerization initiator is di-isopropyl peroxydicarbonate.

9. The organic glass for optical parts as claimed in claim 6, wherein said benzoate ester with an unsaturated alcohol is vinyl benzoate and said methacrylate ester is benzyl methacrylate.

10. The organic glass for optical parts as claimed in claim 9, wherein said polymerization initiator is di-isopropyl peroxydicarbonate.

* * * * *

UNITED STATES PATENT AND TRADEMARK OFFICE
CERTIFICATE OF CORRECTION

PATENT NO. : 4,598,133
DATED : July 1, 1986
INVENTOR(S) : MAKINO et al It is certified that error appears in the above-identified patent and that said Letters Patent is hereby corrected as shown below:

Table 2, down first column to "Comparative example 2", and across under "Impact resistance, 25g", delete "0/10" and insert therefor --10/10--.

Table 2, down first column to "Comparative example 3", and across under "Impact resistance, 25g" delete "0/10" and insert therefor --10/10--.

Table 2, down first column to "Comparative example 4", and across under "Impact resistance, 25g" delete "0/10" and insert therefor --10/10--.

Signed and Sealed this

Twenty-eighth Day of October, 1986

[SEAL]

Attest:

DONALD J. QUIGG

*Attesting Officer*  *Commissioner of Patents and Trademarks*